(12) United States Patent
Farrow et al.

(10) Patent No.: US 6,917,817 B1
(45) Date of Patent: Jul. 12, 2005

(54) MODEM INTEGRATED INTO A RADIO RECEIVER UTILIZING A COMMUNICATION PORT

(75) Inventors: Daniel W. Farrow, Noblesville, IN (US); David F. Origer, Kokomo, IN (US); Daniel D. McDonald, Kokomo, IN (US); Chirag N. Shah, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 411 days.

(21) Appl. No.: 09/627,254

(22) Filed: Jul. 28, 2000

(51) Int. Cl.[7] .............................................. H04M 1/00
(52) U.S. Cl. .................. 455/557; 455/556.1; 455/569.1
(58) Field of Search ................................ 455/554, 555, 455/556, 557, 550, 552, 559; 370/343, 522; 709/209, 207, 217

(56) References Cited

U.S. PATENT DOCUMENTS

| | | | | |
|---|---|---|---|---|
| 5,497,339 A | * | 3/1996 | Bernard ...................... 708/109 |
| 5,594,952 A | * | 1/1997 | Virtuoso et al. ............ 455/557 |
| 5,625,673 A | * | 4/1997 | Grewe et al. ............ 455/556.2 |
| 5,640,444 A | * | 6/1997 | O'Sullivan .................. 455/553 |
| 5,711,012 A | * | 1/1998 | Bottoms et al. ............. 455/557 |
| 5,754,962 A | * | 5/1998 | Griffin ...................... 455/569.2 |
| 5,797,089 A | * | 8/1998 | Nguyen ....................... 455/403 |
| 5,826,198 A | * | 10/1998 | Bergins et al. ............. 455/557 |
| 5,884,190 A | * | 3/1999 | Lintula et al. .............. 455/557 |
| 5,898,920 A | * | 4/1999 | Jacobs ........................ 455/422 |
| 5,991,640 A | * | 11/1999 | Lilja et al. .................. 455/557 |
| 6,026,119 A | * | 2/2000 | Funk et al. .................. 375/222 |
| 6,128,372 A | * | 10/2000 | Tsai et al. ................. 379/90.01 |
| 6,233,464 B1 | * | 5/2001 | Chmaytelli ............... 455/556.2 |
| 6,266,539 B1 | * | 7/2001 | Pardo .......................... 455/556 |
| 6,317,425 B1 | * | 11/2001 | Kim ............................ 370/350 |
| 6,366,787 B1 | * | 4/2002 | Iwamoto .................. 455/550.1 |
| 6,434,403 B1 | * | 8/2002 | Ausems et al. .......... 455/556.2 |
| 6,539,358 B1 | | 3/2003 | Coon et al. |
| 6,542,721 B2 | * | 4/2003 | Boesen ..................... 455/550.1 |
| 6,542,726 B2 | * | 4/2003 | Watanabe .................. 340/7.32 |
| 6,725,061 B1 | * | 4/2004 | Hutchison et al. .......... 455/557 |
| 6,771,980 B2 | * | 8/2004 | Moon ....................... 455/553.1 |
| 2004/0064840 A1 | * | 4/2004 | Liu ............................. 725/153 |

* cited by examiner

Primary Examiner—Charles N. Appiah
(74) Attorney, Agent, or Firm—Stefan V. Chmielewski

(57) ABSTRACT

A system and a method for sending and receiving electronic messages through a radio that incorporates a modem for connecting to a personal digital assistant and a cellular phone by way of a communication port. The communication port provides a cellular link to an Internet service provider for two-way electronic message transfers by the personal digital assistant.

23 Claims, 5 Drawing Sheets

MODEM INTEGRATED INTO A RADIO RECEIVER UTILIZING A COMMUNICATION PORT

TECHNICAL FIELD

The present invention relates to a radio system and more particularly to a radio system incorporating a modem for sending and receiving electronic messages to and from a personal digital assistant.

1. Background of the Invention

The accessibility of information poses unique problems in a highly mobile society. Cellular technology provides access to phone lines in a mobile environment. However, it is often necessary to send and receive electronic messages while in an area that does not have access to a computer terminal and a modem, such as a moving vehicle.

Personal Digital Assistants (PDA's) can be used to display electronic messages. Unfortunately, many PDA's are only capable of displaying messages that have been downloaded to the PDA from a computer. So while these items help to display messages, they are not capable of sending or receiving information without access to a computer terminal.

Currently, there is a need for access to electronic mail, or other Internet information, through a cellular link in a vehicle that conveniently allows a driver to send and receive electronic messages while in the vehicle.

2. Summary of the Invention

The present invention is a system and a method for sending and receiving electronic messages through a radio. The present invention is an integrated audio and communications system having a radio that incorporates a modem for sending and receiving electronic messages through a personal digital assistant and a cellular phone. The radio system includes a modem that is accessed by the personal digital assistant and the cellular phone by way of a communications port. The modem is enhanced for cellular performance.

The communications port provides a cellular link to an Internet service provider for two-way electronic message transfers through the personal digital assistant. The radio monitors signals sent from the communications port and the personal digital assistant and displays messages indicating the status of the communication connection.

It is an object of the present invention to provide a method for sending and receiving electronic messages using an automobile's radio. It is another object of the present invention to provide a link between a cellular phone and a personal digital assistant using the radio. Yet another object of the present invention is to modify the vehicle's radio with a cellular modem for connecting a personal digital assistant to an Internet service provider.

Other objects and features of the present invention will become apparent when viewed in light of the detailed description of the preferred embodiments and when taken in conjunction with the attached drawings and appended claims.

BRIEF DESCRIPTION OF THE DRAWINGS

In order that the present invention may be well understood, there will now be described some embodiments thereof, given by way of example, with reference to the accompanying drawings, in which.

DESCRIPTION OF THE PREFERRED EMBODIMENT

Figure 1:
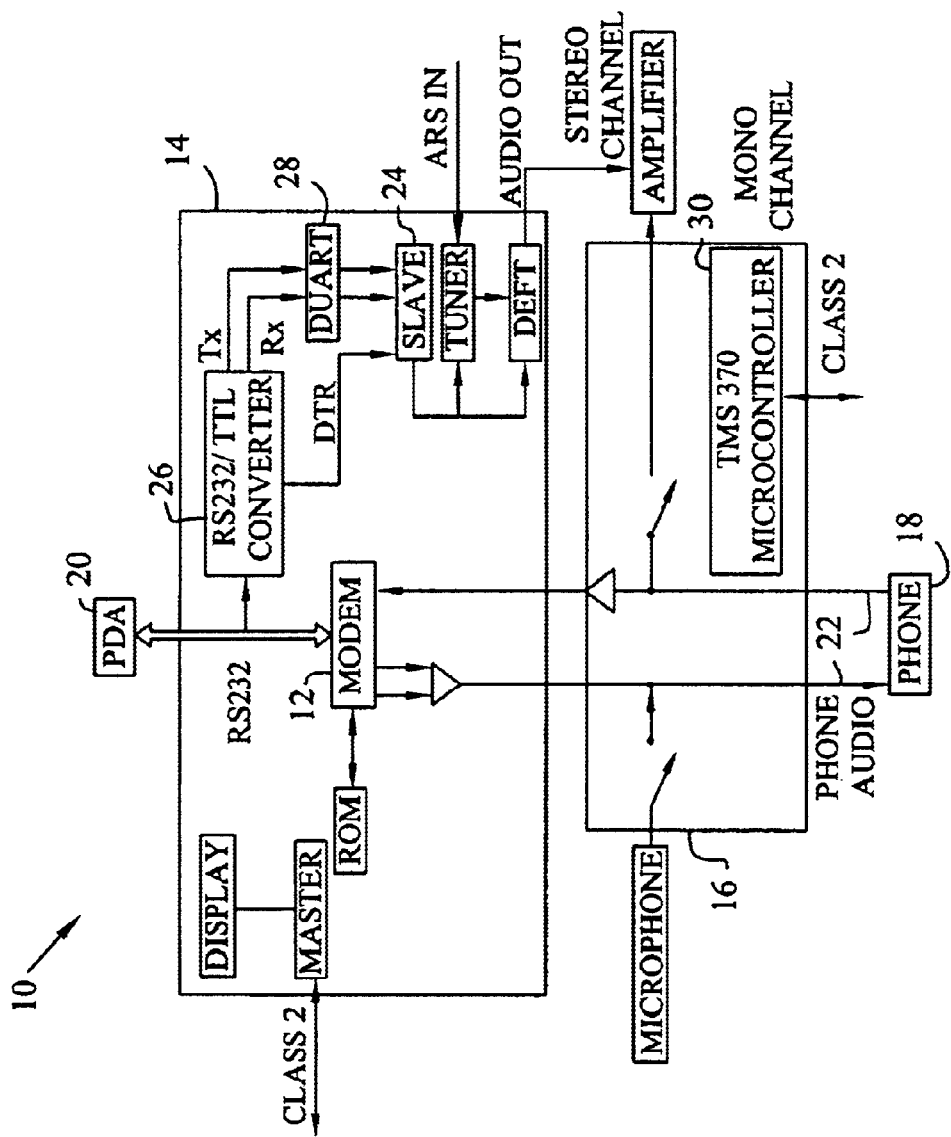
FIG. 1 is a block diagram of a radio system and communications port according to the present invention.

FIG. 1 is a block diagram of the present invention, which is a system 10 by which a radio 14 is used to access electronic messages through a personal digital assistant (PDA) 20. The radio 14 is equipped with a cellular modem 12 and a communication port 16 that provides a link between a cellular phone 18 and the modem 12. The modem 12 and the cellular phone 18 provide the PDA with access to an Internet service provider, thereby allowing a user to send and receive electronic messages through the PDA 20 while the status of the communication connection is displayed by the radio 14.

In the preferred embodiment, the modem is 14.4K baud. The modem 14 has a specific protocol that is enhanced for cellular performance. The communication port 16 provides access to the phone audio 22 in order to facilitate the connection between the phone 18 and the modem 12 in the radio 14. During normal radio operation, the modem 12 is not, powered. A slave microprocessor 24 in the radio 14 monitors transmit (Tx), receive (Rx) and data terminal ready (DTR) input signals sent from the PDA 20. The input signals are converted from RS232 to TTL levels by an RS232/TTL converter 26. The converted signals are buffered by a dual Universal Asynchronous Receiver/Transmitter, or DUART 28.

The transmit signal (Tx) from the PDA 20 is used to supply information for a phone number to be dialed and to terminate a call. The receive signal (Rx) is used to provide the modem 12 status. The DTR signal contains information about the status of the call. During modem 12 use, the communication port 16 will disable all other functions on the radio 14 except for volume control and an end function. The modem 12 should be configured so as not to answer incoming calls.

The radio system 10 of the present invention has a communications protocol that allows the radio 14 to transmit information such as a request for phone status, a request to load a phone number to the phone and a request to end a phone call. The radio 14 must be capable of decoding and acting on standard AT commands used by the modem. In the present invention, the AT commands are used for dialing a phone number, Dn, hanging up the phone, Hn, and an extended results code, Xn.

The PDA 20 is used to send and receive electronic mail messages by way of the communications port 16 through an Internet connection that is established through the cellular phone 18. The messages are sent and received as ASCII text. Therefore, the PDA 20 must have a text program. It should be noted that a traditional electronic mail program might be used in conjunction with customized software to convert the message files to text. There are no limitations on the text program that can be used in conjunction with the present invention.

The communication port 16 is equipped with a controller 30 that contains a software program for controlling the radio system 10 of the present invention according to the method of the present invention. FIGS. 2–5 depict the flow chart for the method of the present invention. Referring now to the flow chart in FIG. 2, the modem is shown in a START mode 102, which allows the user to connect 104 the PDA to the modem. The radio monitors 106 the DTR input signal until a DTR is asserted 108. Once a DTR is asserted, the radio verifies 110 that the phone is available. If the phone is not available, the radio will display 112 a message indicating the status of the phone. For example, the message may read, "PHONE NOT AVAILABLE". The radio then continues to monitor 114 the DTR signal. Once a DTR signal is asserted 116, the radio will again attempt to verify 110 that the phone is available. If a DTR is not asserted 116 the radio will remove 118 power from the modem and terminates the communication session by sending the appropriate termination signal. At the termination of the communication session, all of the radio functions are restored 120, and the modem mode is ended 122.

Figure 2:
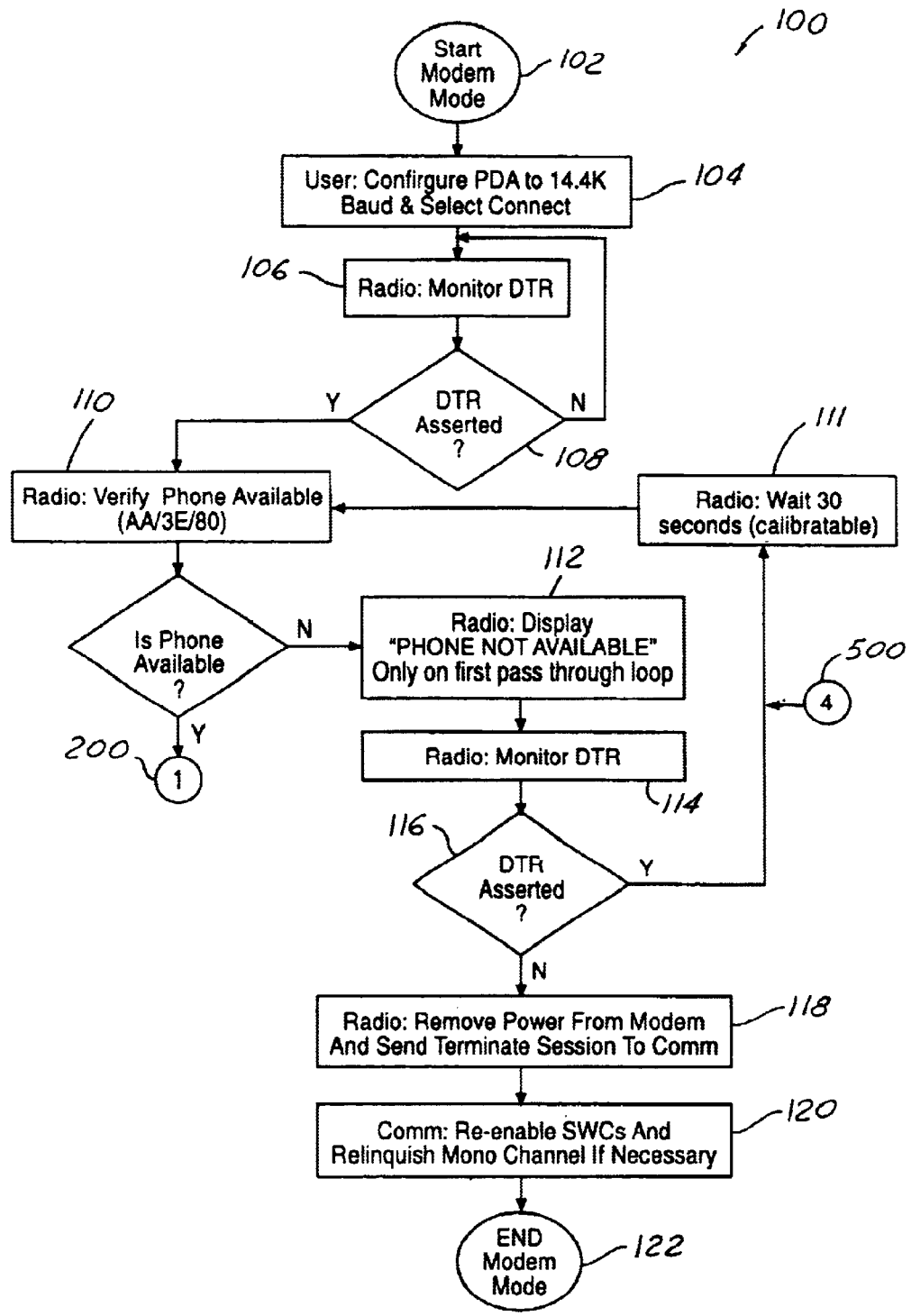
FIG. 2 is a flow chart of the method of the present invention.
Figure 3:
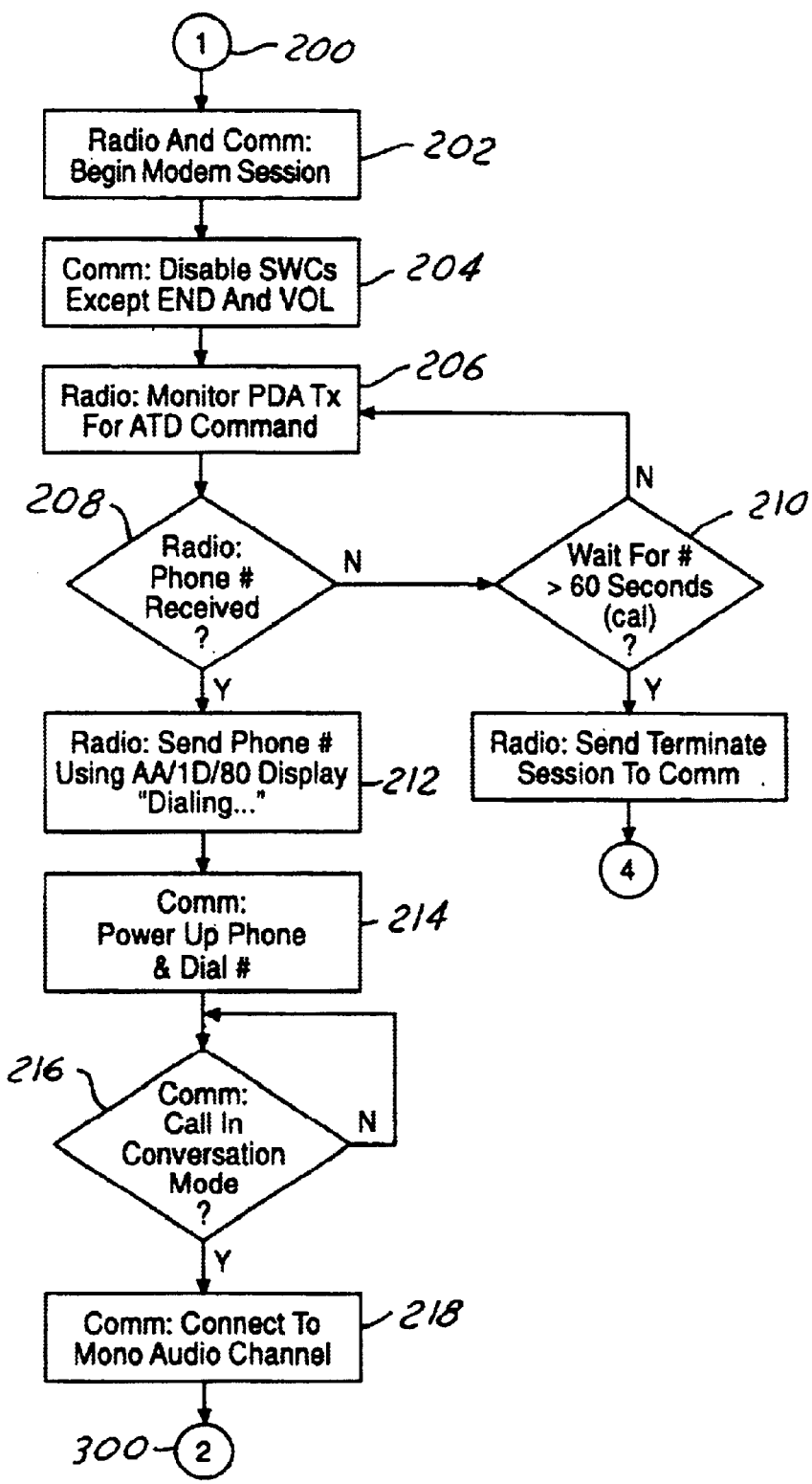
FIG. 3 is a continuation of the flow chart shown in FIG. 2.

FIG. 3 is a continuation of the flow chart shown in FIG. 2 and shows the method of the present invention when the modem is connected and the phone is available 200. The radio and the communications port begin 202 the modem session. The communications port disables 204 all of the radio controls except for an "end" function and the volume control. The radio monitors 206 the PDA and waits to receive a transmit signal and an AT command for the modem from the PDA. Then the radio waits 208 for a signal that indicates a phone number has been received. If a phone number is not received the radio waits 210 for a predetermined period of time and resumes monitoring 206.

When the radio receives 208 a phone number, it sends 212 the phone number to the phone, using a predetermined communications protocol or messaging system. The radio may display a message indicating the status of the communication connection. For example, the message may read "DIALING". Then, the communications port powers up 214 the phone and dials the phone number. According to the method of the present invention, the communications port verifies 216 that the call is in a conversation mode and provides 218 a connection to a mono audio channel.

Figure 4:
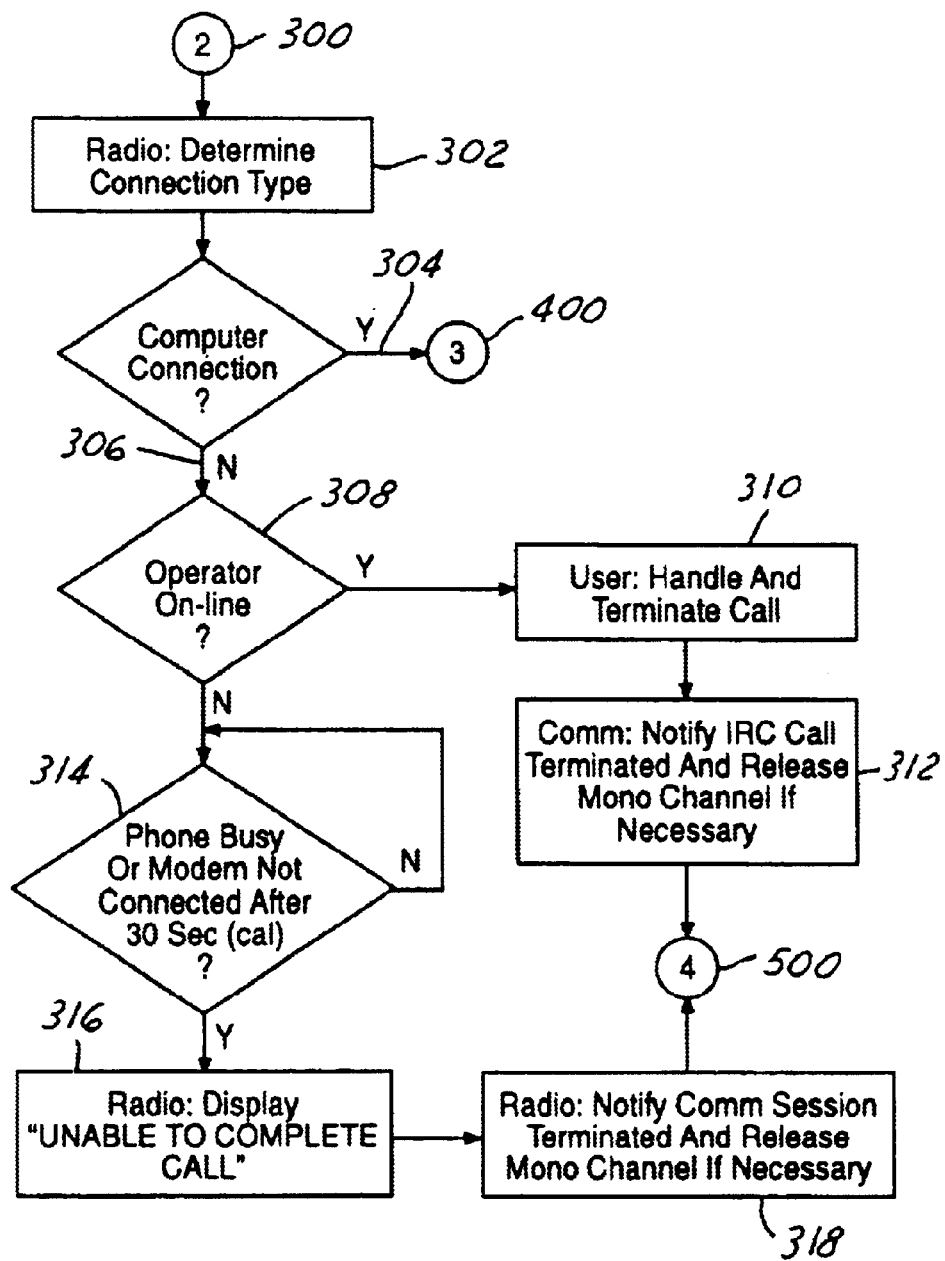
FIG. 4 is a continuation of the flow chart shown in FIG. 3.
Figure 5:
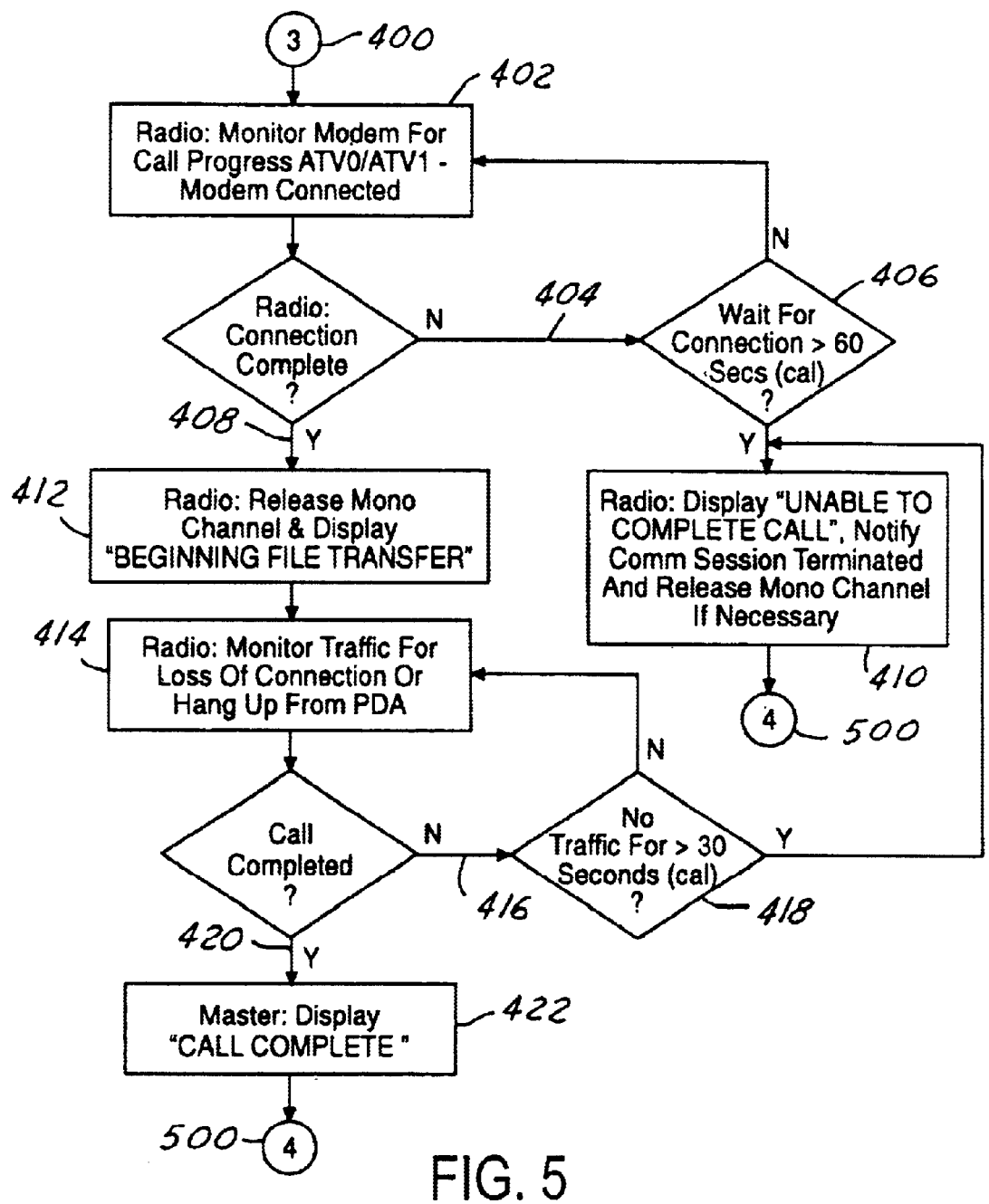
FIG. 5 is a continuation of the flow chart shown in FIG. 4.

Referring now to FIG. 4, a continuation 300 of the flow chart from FIG. 1 is shown. The radio determines 302 the type of connection between the modem and the phone. If the connection is a computer connection 304 a separate process 400 is followed that is shown in FIG. 5. Referring still to FIG. 4, if the connection is not a computer connection 306, the method of the present invention performs a check to determine 308 if an operator is on the phone line. If an operator is present, the call is handled 310 by the user and the session is terminated. The communications port then notifies 312 the radio that the call has been terminated and that the mono audio channel may be released. According to the method of the present invention, at this point the system returns 500 to the point where the radio waits 111 to verify the availability of the phone.

In the absence of both a computer connection and an operator on the line 308, the method of the present invention determines 314 if the phone is busy or the modem is not connected after a predetermined period of time has elapsed. Once it has been determined that the phone is busy or the modem is not connected, the radio displays 316 a message indicating that the call was not completed. For example, the message may read, "UNABLE TO COMPLETE CALL". Then, the radio terminates 318 the call and returns 500 to the point in the system where the radio waits 111 to verify the availability of the phone.

Once the method determines that a computer connection has been established 304 the flow chart continues 400 as shown in FIG. 5. Referring now to FIG. 5, the radio monitors 402 the modem for the progress of the call and verifies the modem is connected. If the radio determines that the connection is not complete 404, the method will wait 406 until the connection lasts for a predetermined period of time and then either resumes monitoring 402 or terminates 408 the communication session and displays a message indicating the same, returning 500 to the point in FIG. 2 where the radio waits 111 for the availability of the phone.

Referring again to FIG. 5, once the method determines that the connection is complete 410, the radio releases the mono channel 412 and displays a message indicating the status of the file transfer to the PDA. For example, the message may read, "BEGINNING FILE TRANSFER". The radio monitors 414 the signal traffic and looks for a loss of the connection or a hang-up signal from the PDA. If the call is not complete, the method of the present invention waits 416 for a predetermined period of time and looks for signal traffic. If there is signal traffic, the method resumes monitoring signal traffic 414. If there is no signal traffic for a predetermined period of time, the radio notifies the communications port that the session has been terminated and releases the mono channel if necessary. The radio may also display a message indicating the status of the communications session. For example, "UNALBE TO COMPLETE CALL".

When the call is completed 420, the radio displays 422 a message indicating the call is complete, for example, "CALL COMPLETE", and returns 500 to the point, shown in FIG. 2, where the radio waits 111 for the availability of the phone.

The system and method of the present invention a radio equipped with a modem and establishes a connection between the PDA and the modem, and a connection between the cellular phone and the modem to allow the PDA to access electronic messages. The microprocessor in the radio is capable of distinguishing different signals to determine the status of the connection and provide updates on the radio's display. For example, the radio is capable of determining if the phone number is being dialed, if the connection is successful, if the data is being transmitted, and if the connection is being terminated. It is also capable of determining if there is a problem in the communication and will display an appropriate message. The system and method of the present invention allow a useful connection to electronic messages through a radio that allows access to information not otherwise readily available to someone traveling as by car or other mode of transportation.

While particular embodiments of the invention have been shown and described, numerous variations and alternate embodiments will occur to those skilled in the art. Accordingly, it is intended that the invention be limited only in terms of the appended claims.

What is claimed is:

1. A radio system for sending and receiving electronic messages from a personal digital assistant through a cellular phone, the radio having a display and a connector for connecting to the personal digital assistant, said system comprising:

a modem incorporated into the radio and having means for connecting to the personal digital assistant;

a communication port having access to said modem and the cellular phone, said communication port including a controller for communicating transmission signals to the radio including signals having information about the status of a communication connection between the personal digital assistant and the cellular phone through said modem; and software for the controller including both instructions for determining the status of the communication connection and instructions for displaying the status of the communication connection between the personal digital assistant and the cellular phone on the display of the radio.

2. The system as claimed in claim 1 wherein said modem further comprises AT commands that are decoded and acted upon by the radio.

3. The system as claimed in claim 2 wherein said AT commands further comprise a dial command, a hang-up command, and an extended results code command.

4. The system as claimed in claim 1 wherein said communication port disables predetermined functions of the radio during communication between the phone and the personal digital assistant so as not to interfere with the data transmission.

5. A method for sending and receiving electronic messages from a personal digital assistant and a cellular phone through a radio system having a modem and a communication port, said method comprising the steps of:

connecting the personal digital assistant to the modem in the radio system;

connecting the cellular phone to the communications port; transmitting a phone number from the personal digital assistant to the radio;

sending the phone number from the radio to the cellular phone; dialling the phone number from the cellular phone;

establishing an audio channel connection between the phone and the modem;

determining the status of a computer connection for the transfer of data between the personal digital assistant and the cellular phone through said modem;

monitoring for a loss of connection or a hang up signal from the personal digital assistant;

ending the audio channel connection upon loss of connection or receipt of said hang up signal; and displaying the status of the communication connection between the personal digital assistant and the cellular phone on the display of the radio.

6. The method as claimed in claim 5 wherein said step of transmitting a phone number further comprises the steps of:

monitoring the connection between the personal digital assistant and the modem for a signal indicating data terminal ready by way of the radio;

verifying the availability of the phone upon receipt of the data terminal ready signal;

disabling all other radio functions by way of the communication port upon confirmation that the phone is available; and monitoring the personal digital assistant for receipt of a phone number to be dialled.

7. The method as claimed in claim 6 wherein said step of monitoring the personal digital assistant for receipt of a phone number to be dialled further comprises the step of sending a signal to the communication port to terminate the audio channel connection after a predetermined period of time elapses without receipt of a phone number.

8. The method as claimed in claim 6 wherein said step of verifying the availability of the phone upon receipt of the data terminal ready signal further comprises the steps of:

displaying a message on the radio indicating the phone is unavailable when the phone is unavailable;

continuing to monitor the personal digital assistant for a data terminal ready signal; and waiting a predetermined period of time before resuming the step of verifying the availability of the phone.

9. The method as claimed in claim 8 further comprising the steps of:

removing power from the modem in the absence of a data terminal ready signal; and terminating the audio channel connection.

10. The method as claimed in claim 5 wherein said step of verifying the existence of a computer connection further comprises the steps of:

determining a computer connection does not exist;

determining the existence of an operator on the audio channel; terminating the cellular phone call;

terminating the audio channel connection;

waiting for a predetermined period of time before resuming the method at the step of verifying the availability of the phone.

11. The method as claimed in claim 5 wherein said step of verifying the existence of a computer connection further comprises the steps of:

determining the status of the phone; and determining the status of the modem.

12. The method as claimed in claim 11 wherein said steps of determining the status of the phone and modem further comprise the steps of:

determining either of phone or the modem are not connected;

displaying a message on the radio that the call cannot be completed;

terminating the audio channel connection; and waiting for a predetermined period of time before resuming the method at the step of verifying the availability of the phone.

13. The method as claimed in claim 5 wherein said step of determining the existence of a computer connection for the transfer of data between the personal digital assistant and the cellular phone further comprises the step of displaying a message on said radio indicating the transfer of data is taking place.

14. The method as claimed in claim 5 wherein said step of monitoring for a loss of connection or a hang up signal from the personal digital assistant further comprises the step of displaying a message on the radio that the call is complete upon receipt of a hang up signal from the personal digital assistant.

15. The method as claimed in claim 5 wherein said step of monitoring for a loss of connection or a hang up signal from the personal digital assistant further comprises the steps of:

determining that there is an absence of signal traffic for a predetermined period of time; and terminating the audio channel connection.

16. The method as claimed in claim 15 further comprising the steps of:

displaying a message on the radio indicating the call is incomplete, terminating the audio channel connection; and waiting for a predetermined period of time before resuming the method at the step of verifying the availability of the phone.

17. A method for sending and receiving electronic messages from a personal digital assistant and a cellular phone through a radio system having a modem, a display and a communication port, said method comprising the steps of:

connecting the personal digital assistant to the modem;

utilizing the communication port as a communication link between the modem and the cellular phone; and determining the status of a communication connection between the personal digital assistant and the cellular phone through the modem and displaying the status of the communication connection on the display of the radio.

18. The method as claimed in claim 17 wherein the utilizing step includes a step of connecting the cellular phone to the communication port.

19. The method as claimed in claim 18 further comprising the steps of:

transmitting a phone number from the personal digital assistant to the radio;

sending the phone number from the radio to the cellular phone;

dialing the phone number from the cellular phone;

establishing an audio channel connection between the phone and the modem;

determining the existence of the communication connection for the transfer of data between the personal digital assistant and the cellular phone;

monitoring for a loss of connection or a hang up signal from the personal digital assistant; and ending the audio channel connection upon loss of connection or the receipt of said hang up signal.

20. A radio system for sending and receiving electronic messages from a personal digital assistant through a cellular phone, said radio system comprising:

a radio including a display, a modem and a connector for connecting to the personal digital assistant;

a communication port connected to said modem and having a connector for connecting to the cellular phone, said communication port including a controller for communicating transmission signals to said radio including signals having information about the status of a communication connection between the personal digital assistant and the cellular phone through said modem; and software for the controller including instructions for determining the status of the communication connection from said communication port and instructions for displaying the status of the communication connection on the display of the radio.

21. The radio system as claimed in claim 20 wherein said modem further comprises AT commands that are decoded and acted upon by the radio.

22. The radio system as claimed in claim 21 wherein said AT commands further comprise a dial command, a hang-up command, and an extended results code command.

23. The radio system as claimed in claim 20 wherein said communication port disables predetermined functions of the radio during communication between the cellular phone and the personal digital assistant so as not to interfere with the data transmission.

* * * * *